United States Patent

[11] 3,580,074

[72] Inventors Vernon C. Wescott
 Lincoln;
 Sidney B. Williams, Lexington, Mass.
[21] Appl. No. 827,276
[22] Filed May 23, 1969
[45] Patented May 25, 1971
[73] Assignee Trans-Sonics, Inc.
 Lexington, Mass.

[54] TEMPERATURE-COMPENSATED LIQUID QUANTITY GAGE
 6 Claims, 2 Drawing Figs.
[52] U.S. Cl. .................................................. 73/304C,
 73/361
[51] Int. Cl. ...................................................... G01f 23/26,
 G01k 7/12
[50] Field of Search ........................................ 73/304, 304
 (G), 361

[56] References Cited
UNITED STATES PATENTS

| | | | |
|---|---|---|---|
| 1,327,800 | 1/1920 | Beighlee ...................... | 73/361 |
| 2,540,658 | 2/1951 | DeGiers et al. ............... | 73/304(C) |
| 3,073,160 | 1/1963 | Shawhan ...................... | 73/304(C) |
| 3,079,797 | 3/1963 | Hermanson .................. | 73/304(C) |
| 3,083,572 | 4/1963 | Pearson ....................... | 73/304(C) |
| 3,119,267 | 1/1964 | Bartky .......................... | 73/304(C) |
| 3,344,668 | 10/1967 | Schuck ......................... | 73/304(C) |

*Primary Examiner*—Louis R. Prince
*Assistant Examiner*—Frederick Shoon
*Attorney*—Blair, Cesari and St. Onge

ABSTRACT: A temperature sensor comprises the usual "hot" thermocouple junction exposed to the temperature to be monitored, a reference junction, a thermally sensitive resistor connected to compensate for changes in the temperature of the reference junction and a readout unit that converts the outputs of these elements to a temperature indication. The reference junction and the resistor are located in the probe that contains the hot junction, so that the leads extending from the probe to the readout unit need not be made of the materials of which the thermocouples are made. The thermally sensitive resistor is in series with the hot junction and reference junction. This permits the use of a single pair of leads to carry current for the resistor and, at the same time, bring back to the readout unit a net voltage comprising the thermocouple junction voltages and the compensating voltage from the resistor.

A capacitive-type liquid quantity gage extending partway down into a tank includes a capacitive liquid level sensor and a temperature sensor positioned to sense the temperature of the liquid monitored by the level sensor. The output of the temperature sensor controls the drive voltage to the level sensor so as to compensate for changes in density and dielectric constant resulting from temperature changes in the liquid. The resulting compensated signal is further adjusted by subtracting from it a signal derived from the temperature sensor to account for expansion or contraction of the liquid below the bottom of the level sensor.

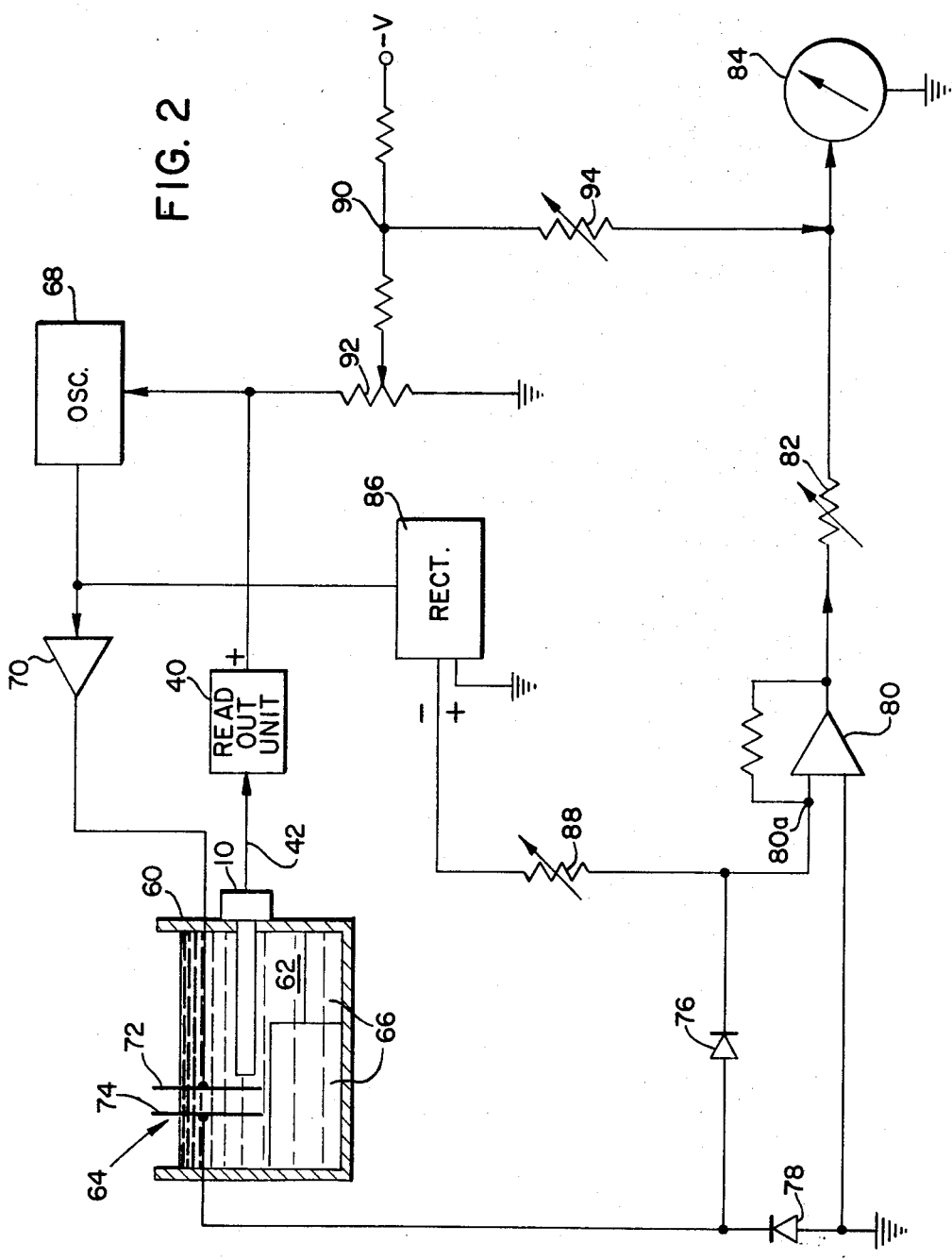

TEMPERATURE-COMPENSATED LIQUID QUANTITY GAGE

1. FIELD OF THE INVENTION

This invention relates to a temperature sensor and to a capacitive tank gauge incorporating the temperature sensor to compensate for changes in the temperature of the liquid monitored by the tank gauge. The temperature sensor is of the thermoelectric type, using a resistance thermometer to compensate for temperature changes in the reference junction.

2. Prior Art

There are, of course, a number of different temperature sensors that can be used to transmit to a remote location signals indicating the temperature of a body of medium. Of these, two types are particularly relevant to the present invention. The first is the thermocouple sensor, in which the voltage developed by a "hot" or sensing thermocouple junction exposed to the monitored temperature is subtracted from the voltage developed by a reference junction, the difference in voltages corresponding to the difference in the temperatures of the two junctions.

For the net output of the thermocouple to be useful, the reference junction must provide a voltage corresponding to a fixed temperature, normally 0° C. This may be accomplished by maintaining the reference junction at the reference temperature, e.g. by means of an ice water bath, or by adding to the reference junction voltage a compensating voltage corresponding to the departure of the reference junction from the standard temperature.

Devices for maintaining reference junctions at fixed temperatures are relatively expensive, a disadvantage that is amplified by the use of a large number of thermocouples in some systems. Moreover, they are bulky and add an element of unreliability to the system.

The compensating devices, which overcome significant disadvantages of the fixed temperature arrangements, make use of a thermally sensitive resistor which is in close thermal proximity to the reference junction and which thereby develops a voltage corresponding to the temperature of this junction. Ideally, the sum of the voltages developed by the reference junction and the thermally sensitive resistor is independent of temperature so that, in effect, the reference junction provides a fixed thermoelectric voltage corresponding to a fixed reference temperature.

Still, however, the system is beset by serious problems. Conventionally, the reference junction and resistance thermometer are located at the readout unit, remote from the probe containing the hot junction. The leads extending from the probe to the readout unit must therefore be of the same materials as the thermoelectric junctions in order to avoid the creation of additional junctions at which unknown temperatures will bring about the injection of error-causing voltages.

These materials, for example, chromel and constantan, are more expensive to make into wires than copper, for example. Also, because it is extremely difficult to match their characteristics with the characteristics of the wires used in the thermocouples, they may introduce additional error-causing thermoelectric voltages. Indeed, it is difficult to make wires of these types whose constituents are sufficiently uniform along the lengths of the wires to avoid the generation of thermoelectric voltages within the wires. Moreover, when wires of this type are used, the connectors must be of the same material to avoid forming thermoelectric junctions at the connectors, and this adds a further element of cost. This problem is also encountered in systems that maintain the reference junctions at fixed temperatures.

Accordingly, it has been proposed to shift the reference junction and compensating resistor from the readout unit to the probe and then run copper back to the readout unit. Copper wires are much less expensive than the usual thermoelectric materials and yet they can be obtained with extremely uniform compositions so as to avoid the introduction of extraneous thermoelectric voltages. However, this arrangement is also characterized by certain disadvantages. It requires the inclusion of a battery in the probe to provide the current required by the thermally sensitive resistor, or, alternatively, the use of extra leads between the probe and the readout unit to conduct current to the resistor.

A resistance thermometer is also suitable for measuring temperatures in many cases. It is a very accurate temperature-measuring device and it avoids the problems presented by spurious thermoelectric voltages. On the other hand, a resistance thermometer is generally bulkier than the hot junction of a thermocouple and, therefore, cannot be placed in many locations that are accessible to a thermocouple junction. Moreover, because of its requirement for a relatively massive support, it has a relatively large thermal mass which cannot easily be isolated from the outside environment. Thus, it has a slower response to changes in the monitored temperature and also, its presence may affect the temperature at the point where the measurement is made, thereby introducing an error into the temperature measurement.

A related aspect of the present invention concerns capacitive-type liquid mass gauges. In a gauge of this nature, a capacitive probe located in a tank, is arranged with an interelectrode space that is occupied by the liquid in the tank to the same level as the liquid in the rest of the tank. Accordingly, the capacitance of the probe corresponds to the quantity of liquid, i.e. its mass. However, changes in temperature introduce errors as a result of both changes in the density of the liquid and changes in its dielectric constant.

The configuration of the tank introduces further problems in some cases. It may difficult or impossible to have the mass probe extend all the way from the top of the tank down to the bottom. Consequently, it may extend only part way down from the top, in which case it directly measures only quantities of liquid above its lower end. This adds a further complication to errors caused by changes in the temperature of the liquid.

OBJECTS OF THE INVENTION

A principal object of the present invention is to provide a temperature sensor of the thermocouple type which is accurate and incorporates low-cost leads of uniform material between the temperature probe and the readout unit.

Another object of the invention is to provide a sensor of the above type which is characterized by fast response to changes in temperature.

A further object of the invention is to provide a temperature sensor of the above type that requires minimal maintenance at the probe, so that the probe may be located at remote and inaccessible locations.

Yet another object of the invention is to provide a temperature sensor of the above type that requires a minimum number of leads.

A still further object of the invention is to provide a capacitive liquid quantity gauge that is compensated for changes in the temperature of the monitored liquid.

Other objects of the invention will in part be obvious and will in part appear hereinafter.

SUMMARY OF THE INVENTION

Briefly, a temperature sensor embodying the invention employs both a thermocouple and a thermally sensitive resistor. Both the hot and reference junctions of the thermocouple are located at the probe. The resistor, which provides compensation for temperature changes of the reference junction is also located there. In this way, the leads extending from the probe to the readout unit can, as discussed above, be made of a material that is inexpensive and, at the same time, does not introduce spurious thermoelectric voltages. However, in contrast with the previously proposed arrangements of this type, there is no battery at the probe, and yet only two leads extend from the probe.

This advance is based on the fact that the current needed to sense the resistance of the compensating resistor can also be passed through the thermoelectric junctions without affecting them, as long as the resistance of the resistor is much greater than the resistance of the thermocouple wires and junctions. We therefore connect the resistor directly in series with all the junctions and pass current to the resistor through a single pair of leads extending from the ends of the resulting series combination of probe elements. The net voltage between the two leads is then the sum of the thermocouple junction voltages and the temperature-compensating voltage across the resistor. This voltage, which is sensed at the readout unit, accurately reflects the temperature of the hot junction of the thermocouple.

Where the body whose temperature is being measured is associated with such a high thermal impedance that the measuring instrument itself might affect the measurement, the hot junction of the thermocouple can be relatively isolated from the rest of the probe. However, it will ordinarily be desirable to have the temperature-sensitive resistor and reference junctions in close thermal proximity with the hot junction. The temperatures of the two junctions will then be approximately the same so that the net thermoelectric voltage will be relatively small, with most of the temperature reading then being reflected by the voltage across the resistor. Since the resistor is generally a more accurate temperature-sensing component than a thermocouple, this use of the resistor to, in effect, take over most the measurement, materially increases the accuracy of the instrument.

At the same time, the relatively low thermal mass of the hot junction will permit this junction to respond quickly to changes in temperature. Thus, during rapid temperature changes, the thermoelectric component of the output voltage of the probe will be greater than during intervals in which the temperature changes are minimal. The accuracy of the probe will therefore diminish during fast temperature changes. However, at these times, the requirement for accuracy is generally relaxed. That is, the fact of the change and its intensity are more important than the absolute value of the temperature.

Another facet of the invention involves the use of a thermopile or multiple thermocouple sensor instead of a single thermocouple. This increases the output voltage of the probe and effectively increases the signal-to-noise ratio of the system.

In a capacitive tank gauge embodying the invention, we preferably employ a liquid-sensing arrangement of the type described in the copending application of Vernon C. Westcott et al. for TANK QUANTITY GAGE, Ser. No. 794,668, filed Jan. 28, 1969. An oscillator applies a drive voltage to one electrode of a sensing capacitor and a rectifier connected to the other electrode of the capacitor rectifies the current through it. This current is proportional to the capacitance of the capacitor and thus corresponds to the level of the liquid in its interelectrode space. A temperature sensor, preferably of the type described herein, is located near the liquid sensor so that its output corresponds to the temperature of the liquid. This output is used to control the amplitude of the oscillator in accordance with temperature changes so as to maintain the current through the capacitor essentially independent of temperature and thus permit the liquid sensor to be used for measurement of the mass of liquid contained in the tank.

The output of the temperature sensor gauging system also provides a signal that is subtracted from the rectified output of the liquid-sensing capacitor so as to compensate for expansion or thermal contraction of liquid below the bottom of the sensor.

The tank gauge has a simple construction and a relatively simple circuit. At the same time, it provides an accurate reading of the mass of the monitored liquid over a wide temperature range.

BRIEF DESCRIPTION OF THE DRAWINGS

For a fuller understanding of the nature and objects of the invention, reference should be had to the following detailed description taken in connection with the accompanying drawings, in which:

FIG. 2 is a schematic diagram of a liquid mass gauge embodying the invention.

DESCRIPTION OF THE PREFERRED EMBODIMENT

Figure 1:
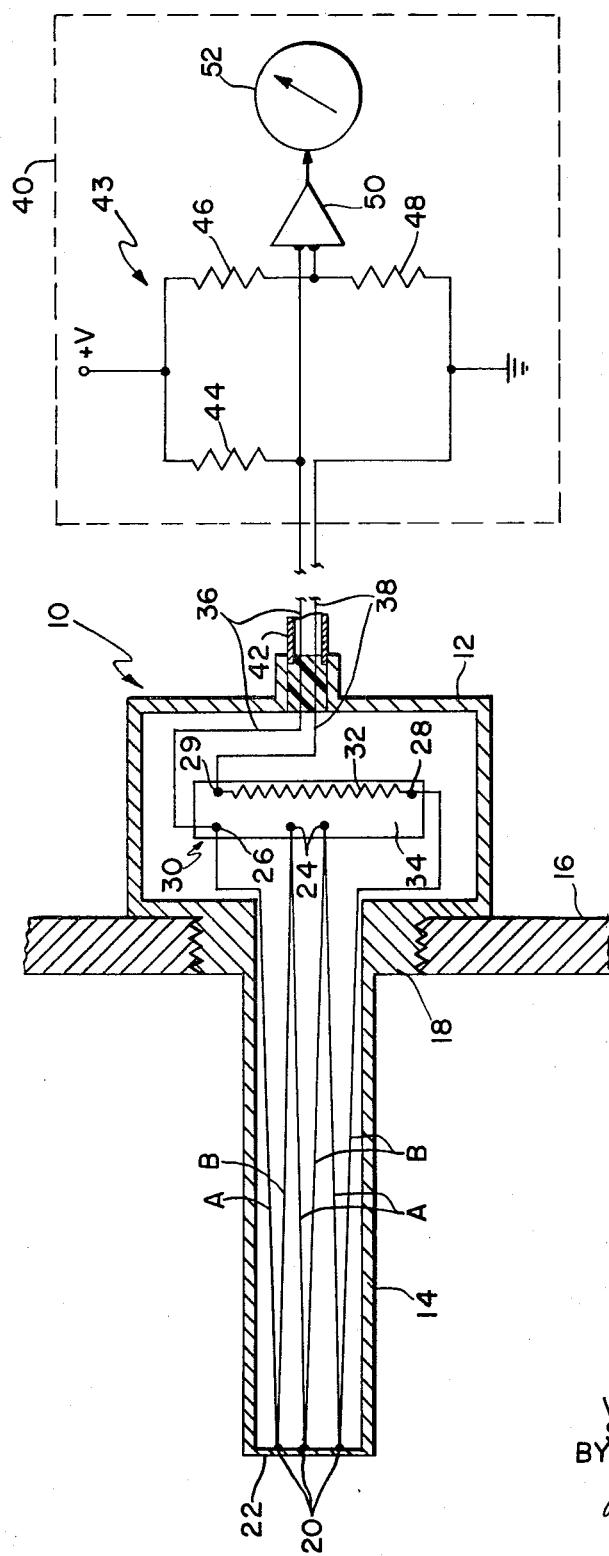
FIG. 1 is a diagram, partly in section and partly schematic, of a temperature sensor embodying the invention.

As shown in FIG. 1, a temperature probe 10 embodying the invention has a housing 12 from which a tube 14 extends into a tank through a wall 16. A threaded adapter 18 secures the probe in place. The working elements of the probe are (a) a thermopile comprising a set of "hot" or sensing junctions 20 cemented to the tip 22 of the tube 14 and a set of reference junctions 24, 26, 28 and 29 disposed in the housing 12 and (b) a resistance thermometer 30 also located in the housing. A pair of leads 36 and 38, preferably copper wires, extend from the junctions 26 and 29 to a readout unit 40 by way of a cable 42.

The resistance thermometer 30 is in the form of thermally sensitive resistance wire 32 wound on a bobbin 34. The reference junctions 24—29 are also affixed to the bobbin so as to have the same temperature as the wire 32.

The thermocouples in the thermopile are formed by wires of different materials A and B, as shown. Thus, the thermoelectric voltages developed at junctions 20 are the voltages developed by an A–B junction. The voltages developed at the reference junctions 24 are those that result from a B–A junction, and the net voltage developed at the junctions 26, 28 and 29, are also equal to the voltage at a B–A junction. The junctions 26, 28 and 29 are often termed "secondary" junctions; however, inasmuch as their net effect is that of a reference junction, We have applied the latter term to them herein.

The net voltage developed by the thermopile, appearing between the leads 36 and 38, corresponds to the difference in the temperatures of the junctions 20 on the one hand, and the bobbin 34 to which the various reference junctions are attached. Since the thermopile comprises three thermocouples connected in series, the total thermoelectric voltage is three times the voltage of a single thermocouple. The voltage between the leads 36 and 38 also reflects the voltage drop across the resistance wire 32 due to a current which is passed through this wire in a manner now to be described.

More specifically, the readout unit 40 includes resistors 44, 46 and 48 connected as three arms of a bridge circuit 43 whose fourth arm is the resistance wire 32. A voltage is applied across the bridge as shown and an amplifier 50 is connected so that its input is the unbalance voltage of the bridge. The output of the amplifier is applied to a meter 52 calibrated in terms of temperaure.

Assuming that the bridge circuit is balanced at a reference temperature, there will be no input to the amplifier 50 from the bridge 43 when the resistance thermometer 30 is at that temperature. If the hot junctions 20 are at the same temperature as the reference junctions 24, 26, 28 and 29, there will be no output voltage from the thermopile either and the meter 52 will then be at its zero position, corresponding to the reference temperature.

Should the temperature of the hot junctions 20 change, the net thermoelectric voltage on the leads 36 and 38, less attenuation by the bridge circuit 43, will provide an input for the amplifier 50 and the meter 52 will respond accordingly. Should the temperature of the reference junctions depart from the reference temperature, the total thermoelectric voltage of these junctions will, of course, change. However, the temperature of the resistance wire 32 will change by the same amount and the corresponding change in the resistance of the wire 32 will provide an unbalance voltage in the bridge circuit, equal in magnitude, and opposite in polarity, to the change in thermoelectric voltage as reflected at the amplifier 50. Thus, there will be no change in the input voltage of the amplifier 50 or the temperature indication of the meter 52.

In one embodiment of the invention, the bobbin 34 and the components mounted thereon are in close thermal communication with the hot junctions 20, by virtue of thermal conduction along the tube 14 and through the tank wall 16 and adapter 18 into the housing 10. The temperature of the reference junctions then approaches the temperature of the hot junctions 20 so that the net thermoelectric voltage is relatively small. However, the temperature of the wire 32 also approximates that of the hot junctions 20. Thus, the resistance of the wire 32 represents most of the temperature signal from the probe 10. Since, as pointed out above, a resistance wire is generally a more accurate temperature sensor than a thermocouple, this enhances the accuracy of the probe as a whole. Yet, the low thermal mass of the junctions 20 and the probe tip 22 permits the junctions 20 to respond to rapid changes in the temperature of the monitored medium, such changes thus being reflected primarily by an increase in the net thermal electric voltage from the probe 10.

In cases where inaccuracy of temperature measurement is largely due to heat flow into or out of the probe from the object whose temperature is being measured, the tube 14 may be made of a thin walled material having low thermal conductivity, thereby isolating the junctions 20 from the other elements of the probe.

Ordinarily, it will be desirable to have the resistances of the resistors 44 and 46 substantially greater than the resistances of the wire 32 and resistor 48. This will materially reduce the attenuation of the thermoelectric voltage from the probe 10 by the bridge circuit 43.

Also, as shown in FIG. 1, we prefer to use a thermopile instead of a single thermocouple in order to obtain a greater thermoelectric voltage from the probe 10. This increases the input voltage of the amplifier 50 substantially above the changes in output signal caused by amplifier drift, thereby increasing the accuracy of the system.

FIG. 2 illustrates a capacitive tank-gauging system employing a temperature sensor, preferably of the above type, in a circuit that compensates for changes in the temperature of the liquid contained in the tank. A tank 60 containing a liquid 62, e.g. lubricating oil for an aircraft engine, is provided with a capacitive sensor 64 that extends part way down into the tank. Because of obstructions 66, the sensor 64 cannot reach to the bottom of the tank 60. The sensor 64 is driven from an oscillator 68 by way of an amplifier 70 connected to an input electrode 72. An output electrode 74 is connected to a rectifier comprising diodes 76 and 78, the diode 76 being connected in series, and the diode 78 in shunt, as shown. The current through the diode 76 is fed to an amplifier 80 whose output passes through a calibration resistor 82 to a meter 84.

The amplifier 80 is a high-gain amplifier provided with a substantial feedback ratio so that its input terminal 80a is maintained essentially at ground. This provides a substantially zero input impedance for the amplifier. Thus, assuming a correspondingly low-output impedance for the amplifier 70, the current through the sensor 74, to which the amplifier 80 responds, is essentially proportional to the capacitance of the sensor.

An output from the oscillator 68 is rectified by a rectifier 86 whose output in turn is passed through an adjusting resistor 88 to the input terminal 80a of the amplifier 80. The rectifier 86 has an output whose polarity is opposite to that of the rectified current from the sensor 74. The resistor 88 is adjusted so that the current from the rectifier 86 applied to the terminal 80a corresponds to the current through the sensor 74 in the absence of liquid in its interelectrode space, i.e. with an air dielectric. In this manner, the air dielectric portion of the capacitance of the sensor 74 is subtracted from the total capacitance and the output of the amplifier 80 is thus directly proportional to the capacitance resulting from the liquid in the interelectrode space. It is therefore also proportional to the mass of liquid above the bottom of the sensor 74.

As mentioned above, changes in the temperature of the liquid 62 change the density of the liquid and also its dielectric constant. Specifically, an increase in temperature expands the liquid and thus increases its height in the sensor 64, thereby tending to increase its apparent mass. At the same time, a temperature increase decreases the dielectric constant, thereby tending to decrease the apparent mass. These two effects do not cancel each other out and the difference is made up by a correction corresponding to the temperature of the liquid. This is provided by the temperature sensor 10 and readout unit 40, whose output alters the amplitude of the oscillator 68 according to the temperature in the tank 60.

This compensates for changes in the temperature of the liquid above the bottom of the sensor 74. It does not, however, take care of thermal expansion and contraction of the liquid below the bottom of the sensor. Additional compensation for the factor is provided as follows.

A constant voltage −V from a suitable source is summed at a junction 90 with the voltage from a potentiometer 92 to which the output of the temperature readout unit 40 is applied. The potentiometer is adjusted to provide a zero voltage at the junction 90 at a specified reference temperature (not necessarily the same as the reference temperature of the sensor 10 described above in connection with FIG. 1). When the temperature of the liquid increases, thereby expanding the liquid below the sensor 74, the positive output of the readout unit 40 decreases and the voltage at the junction 90 becomes correspondingly negative. A negative current is thus applied to the meter 84 by way of a variable resistor 94, thereby diminishing the current from the amplifier 80. The resistor 94 is adjusted so as to reduce the meter current to the reading it would have had if there had been no change in temperature. Similarly, a decrease in the liquid temperature below the reference point causes the injection of positive current by way of the resistor 94, again compensating for the change in the mass of the liquid below the bottom of the sensor 74.

It will be apparent that the tank gauge illustrated in FIG. 2 is characterized by relative simplicity of circuit design. Yet, at the same time, it provides not only the temperature compensation required in conventional installations, but also a further element of compensation permitting the use of sensors that extend only part way to the bottom of a tank.

It will thus be seen that the objects set forth above, among those made apparent from the preceding description, are efficiently attained.

We claim:

1. A liquid mass gauge comprising
   A. a capacitive liquid sensor having first and second electrodes,
   B. an alternating current generator connected to said first electrode so as to pass a current through said sensor,
   C. a rectifier connected to said second electrode so as to rectify said sensor current,
   D. a temperature sensor arranged to provide a temperature signal corresponding to the temperature of the liquid monitored by said liquid sensor, and
   E. means applying said temperature signal to said generator to vary the output of said generator by an amount proportional to the variation in volume of said liquid due to temperature changes so as to maintain said sensor current substantially independent of changes in the temperature of the liquid above the bottom of the sensor before and after temperature changes.

2. The gauge defined in claim 1, including means responsive to said temperature signal for adding to the capacitive sensor current a compensation current corresponding to the change in mass of the liquid below the bottom of the capacitive sensor resulting from changes in the temperature of said liquid, thereby to provide a gauge output signal substantially independent of the temperature of said liquid.

3. The gauge defined in claim 2 including means for subtracting from the capacitive sensor current a current corresponding to the air dielectric capacitance of the capacitive sensor.

4. The gauge defined in claim 1 including

A. means for summing the temperature signal with a reference signal corresponding to a selected reference temperature so as to provide a compensating voltage corresponding to the difference between the mass of liquid below the bottom of the capacitive sensor and the mass at a reference temperature, and
B. means for adding to the capacitive sensor current a current proportional to the compensating voltage, thereby to provide an output current substantially independent of the temperature of said liquid.

5. The system defined in claim 1 in which said temperature sensor comprises
   A. a probe including
      1. one or more thermoelectric sensing junctions,
      2. one or more reference junctions in series with said sensing junctions, and
      3. a thermally sensitive resistor
         a. in series with said junctions, and
         b. in close thermal proximity to said reference junctions,
      4. a pair of leads
         a. extending from said probe, and
         b. connected to opposite ends of the series combination of said resistor and said junctions, and
   B. a readout unit
      1. remote from said probe,
      2. including means for passing current though said leads and thereby through said resistor and said junctions, and 3. including means for sensing the voltage between said leads to provide said temperature signal.

6. A liquid mass gauge having a single capacitive sensor for indicating the mass of fluid in a tank, said gauge comprising:
   A. a capacitive sensor:
      1. having opposed plates for immersion in the fluid within said tank with a part of said fluid normally below the bottom of said sensor plates;
      2. providing an output indicative of the fluid mass between said plates;
   B. a temperature sensor providing an electrical output indicative of the temperature of the fluid in the tank in the vicinity of the capacitive sensor;
   C. a source of alternating current responsive to the temperature sensor output to apply to the sensing capacitor a driving signal whose magnitude varies in inverse proportion to liquid volume changes caused by temperature changes, whereby the sensing capacitor output is maintained independent of temperature;
   D. means adding to the sensing capacitor output a signal corresponding to the temperature sensor output and indicative of the change in fluid mass below the sensor plates resulting from changes in temperature of said fluid, to thereby provide a gauge output signal substantially independent of the temperature of said fluid.